US012427720B2

(12) United States Patent
Sivaprasad et al.

(10) Patent No.: US 12,427,720 B2
(45) Date of Patent: Sep. 30, 2025

(54) METHOD FOR MANUFACTURING PRECISION ARTICLES WITH INKS HAVING HIGH MOBILITY VEHICLE FLUIDS (71) Applicant: 3D Systems, Inc., Rock Hill, SC (US)

(72) Inventors: Akarsh Sivaprasad, Nashua, NH (US); David Sabo, San Diego, CA (US); Grant Draper, Escondido, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 76 days.

(21) Appl. No.: 18/612,145

(22) Filed: Mar. 21, 2024

(65) Prior Publication Data
US 2024/0326334 A1  Oct. 3, 2024

Related U.S. Application Data (60) Provisional application No. 63/492,841, filed on Mar. 29, 2023.

(51) Int. Cl.
*B29C 64/25* (2017.01)
*B29C 64/124* (2017.01)
(Continued)

(52) U.S. Cl.
CPC ............ *B29C 64/25* (2017.08); *B29C 64/124* (2017.08); *B29C 64/129* (2017.08);
(Continued)

(58) Field of Classification Search
CPC ... B29C 64/124; B29C 64/129; B29C 64/135; B29C 64/245; B29C 64/25; B29C 64/35; B29C 64/364
See application file for complete search history.

(56) References Cited

U.S. PATENT DOCUMENTS 10,967,561 B2 * 4/2021 Wang ..................... B33Y 30/00
2016/0303795 A1 * 10/2016 Liu ........................ B29C 64/364
(Continued)

FOREIGN PATENT DOCUMENTS

CN    111497229 A    8/2020
CN    113386347 A    9/2021

OTHER PUBLICATIONS

PCT International Search Report for International Search Authority for PCT/US2024/020881 mailed Jun. 27, 2024 (6 pages).
(Continued)

Primary Examiner — Jeffrey M Wollschlager (57) ABSTRACT

A three-dimensional (3D) printing includes a rigid base, a build vessel supported on the rigid base, and an imaging module. The build vessel includes a lower frame structure, a transparent plate supported by the lower frame structure, a transparent sheet supported above the transparent plate, a vented housing supported by the lower frame structure, a desiccant disposed within the vented housing, and a vessel wall coupled to the lower frame structure. A fixed or variable fluidic region is defined between the transparent plate and the transparent sheet. The vented housing includes openings fluidically communicating with the fluidic region to allow the desiccant to deplete vapor from the fluidic region. The vessel wall and transparent sheet are configured to provide an upward facing reservoir. The imaging module is supported by the rigid base and configured to selectively image the photocurable liquid over a build plane above the transparent sheet.

8 Claims, 9 Drawing Sheets (51) Int. Cl.
  *B29C 64/129*  (2017.01)
  *B29C 64/245*  (2017.01)
  *B29C 64/255*  (2017.01)
  *B29C 64/264*  (2017.01)
  *B29C 64/35*  (2017.01)
  *B29C 64/364*  (2017.01)
  *B33Y 10/00*  (2015.01)
  *B33Y 30/00*  (2015.01)

(52) U.S. Cl.
  CPC .......... *B29C 64/245* (2017.08); *B29C 64/255* (2017.08); *B29C 64/264* (2017.08); *B29C 64/35* (2017.08); *B29C 64/364* (2017.08); *B33Y 10/00* (2014.12); *B33Y 30/00* (2014.12)

(56) References Cited

U.S. PATENT DOCUMENTS

| | | | | |
|---|---|---|---|---|
| 2019/0111622 A1* | 4/2019 | Khalip | .................. | B29C 64/268 |
| 2019/0160733 A1* | 5/2019 | Mirkin | .................. | B29C 64/129 |
| 2019/0255612 A1* | 8/2019 | Mark | .................... | B29C 64/295 |
| 2020/0039142 A1* | 2/2020 | Childers | ............... | B29C 64/379 |
| 2020/0094468 A1* | 3/2020 | Feller | ................... | B29C 64/124 |
| 2020/0247039 A1* | 8/2020 | Jau | ........................ | B29C 64/357 |
| 2020/0247051 A1* | 8/2020 | Jau | ........................ | B29C 64/264 |
| 2020/0307100 A1* | 10/2020 | Sabo | ..................... | B33Y 50/02 |
| 2021/0268738 A1* | 9/2021 | Kenworthy | ............ | B33Y 40/10 |
| 2021/0323230 A1* | 10/2021 | Sabo | ..................... | B29C 64/393 |

OTHER PUBLICATIONS

PCT International Written Opinion for International Search Authority for PCT/US2024/020881 mailed Jun. 27, 2024 (8 pages).

Machine translation of CN113386347A, received with International Search Report and Written Opinion for CN113386347A, EPO, dated Jun. 20, 2024 (66 pages).

* cited by examiner

METHOD FOR MANUFACTURING PRECISION ARTICLES WITH INKS HAVING HIGH MOBILITY VEHICLE FLUIDS

CROSS-REFERENCE TO RELATED APPLICATIONS

This non-provisional patent application claims priority to U.S. Provisional Application Ser. No. 63/492,841, Entitled "Method for Manufacturing Precision Articles with Inks Having High Mobility Vehicle Fluids" by Akarsh Sivaprasad et al., filed on Mar. 29, 2023, incorporated herein by reference under the benefit of U.S.C. 119 (e).

FIELD OF THE INVENTION

The present disclosure concerns an apparatus and method for fabrication of solid three dimensional (3D) articles of manufacture from radiation curable materials. More particularly, the present disclosure concerns a way of reducing or limiting an impact of highly diffusive vehicular fluids such as water in photocurable fluids.

BACKGROUND

Three dimensional (3D) printers are in rapidly increasing use for manufacturing customized articles. One class of 3D printers includes stereolithography printers having a general principle of operation including the selective curing and hardening of radiation curable (i.e., photocurable) liquids. One type of stereolithography system includes a containment vessel holding the photocurable liquid, a movement mechanism coupled to a support tray, and a light engine. The stereolithography system forms a three dimensional (3D) article of manufacture by selectively curing layers of the photocurable liquid along a build plane. There is a desire to produce efficiently produce 3D articles having feature size tolerances that are less than 10 microns, less than five microns, or less than 2 microns in size. Various challenges to fabricating such small geometries include limitations on the optical and mechanical systems that are historically suitable for tolerances that are more in a range of 20 microns or larger. One particular challenge is an impact of vapors and residues of the photocurable liquid on an optical path from the light engine to the build plane.

SUMMARY

In a first aspect of the disclosure a three-dimensional (3D) printing system is configured to manufacture a 3D article. The 3D printing system includes a rigid base, a build vessel supported on the rigid base, and an imaging module. The build vessel includes a lower frame structure, a transparent plate supported by the lower frame structure, a transparent sheet supported above the transparent plate, a vented housing supported by the lower frame structure, a desiccant disposed within the vented housing, and a vessel wall coupled to the lower frame structure. A fixed or variable fluidic region is defined between the transparent plate and the transparent sheet. The vented housing includes openings fluidically communicating with the fluidic region to allow the desiccant to deplete vapor from the fluidic region. The vessel wall and transparent sheet are configured to provide an upward facing reservoir. The imaging module is supported by the rigid base and configured to selectively image the photocurable liquid over a build plane above the transparent sheet.

The imaging module emits radiation that follows an optical path that passes upward through the transparent plate, through the fluidic region, through the transparent sheet, and to the build plane. The transparent sheet is semipermeable and therefore transmits an inhibitor from the fluid region to a depletion zone above the transparent sheet to prevent photocurable liquid from hardening onto the transparent sheet. The photocurable liquid contains a relatively small molecule component such as water that diffuses downward through the transparent sheet and forms a vapor such as water vapor in the fluidic region. The desiccant absorbs and depletes the water vapor thereby preventing deposition of water upon surfaces surrounding the fluidic region which would otherwise interfere with the optical path.

The transparent plate is rigid and transparent to radiation in the blue to ultraviolet region or about 500 nm (nanometers) to 100 nm. The transparent plate can be formed from glass, quartz, or other suitable materials that are transparent to such radiation.

The transparent sheet is formed from a single layer or multilayer polymeric material that is compatible with the photocurable liquid and transparent to the radiation (as described supra). One example of a suitable transparent sheet is a fluoropolymer with optical clarity and gas permeability such as Teflon™ AF 2400. Other polymeric sheet materials can be suitable for the particular application.

The desiccant can be any material suitable for absorbing the particular vapor. Examples of such desiccants include silica gel, bentonite clay, and a molecular sieve. Other desiccants are known in the art.

In one implementation, the vented housing includes or defines a lateral array of perforations that provide fluid communication between the desiccant and the fluidic region. The lateral array of perforations can be disposed on an upper and/or a lower side of the vented housing.

In another implementation, the transparent sheet is stretched over a raised portion of the vented housing. The raised portion can be a peripheral or inward upper ridge of the vented housing.

In yet another implementation, the vented housing includes an upper surface that slopes inward from an outer edge of the fluidic region. The upper surface can define an array of perforations that fluidically couple the desiccant to the fluidic region.

In a further implementation, the build plane is laterally truncated by an edge of the vented housing. The truncated build plane can be a truncated circular region. Alternatively, the build plane can have a shape of a rectangle, a truncated ellipse, a square, a polygon, a circle, an ellipse, or an irregular shape.

In a yet further implementation, the upward facing reservoir contains the photocurable liquid. The photocurable liquid at least includes water, a monomer, and a photoinitiator. The water diffuses downward through the transparent sheet and forms a water vapor in the fluidic region. The desiccant depletes the water vapor from the fluidic region.

In a second aspect of the disclosure, a method of manufacturing a three-dimensional (3D) article includes the following steps. First, a build vessel is provided which includes a lower frame structure, a transparent plate supported by the lower frame structure, a transparent sheet supported by the lower frame structure above the transparent plate, and a vessel wall. A fixed or variable fluidic region is defined between the transparent plate and the transparent sheet. The vessel wall and transparent sheet are configured to form an upward facing reservoir. Assembling the build vessel further includes disposing a desiccant in fluid communication with the fluidic region. The method further includes loading photocurable fluid into the upward facing reservoir, lowering a build plate into the photocurable fluid, positioning a lower surface of the build plate at a build plane above the transparent sheet, and operating an imaging module to selectively solidify a layer of the photocurable fluid at the build plane.

In one implementation, the lower frame structure includes a vented housing in fluidic communication with the fluidic region. Disposing the desiccant includes loading the desiccant into the vented chamber. The vented housing laterally truncates an area of the transparent sheet to define a truncated build plane area. The imaging module operation is limited to the truncated build plane area. The truncated build plane area can define a truncated circle. Alternatively, the truncated build plane area can define other shapes such as circular, polygonal, square, rectangular, triangular, or irregular.

In another implementation, the fluid region is pressurized to maintain planarity of the transparent sheet and a consistent gap between the transparent sheet and the transparent plate while operating the imaging module.

In yet another implementation, the transparent sheet is pressed against the transparent plate while operating the imaging module.

In a further implementation the photocurable fluid includes water, a monomer, and a photo initiator. The water diffuses through the transparent sheet and into the fluidic region as water vapor. The desiccant depletes water vapor from the fluidic region.

DETAILED DESCRIPTION OF THE PREFERRED EMBODIMENTS

Figure 1:
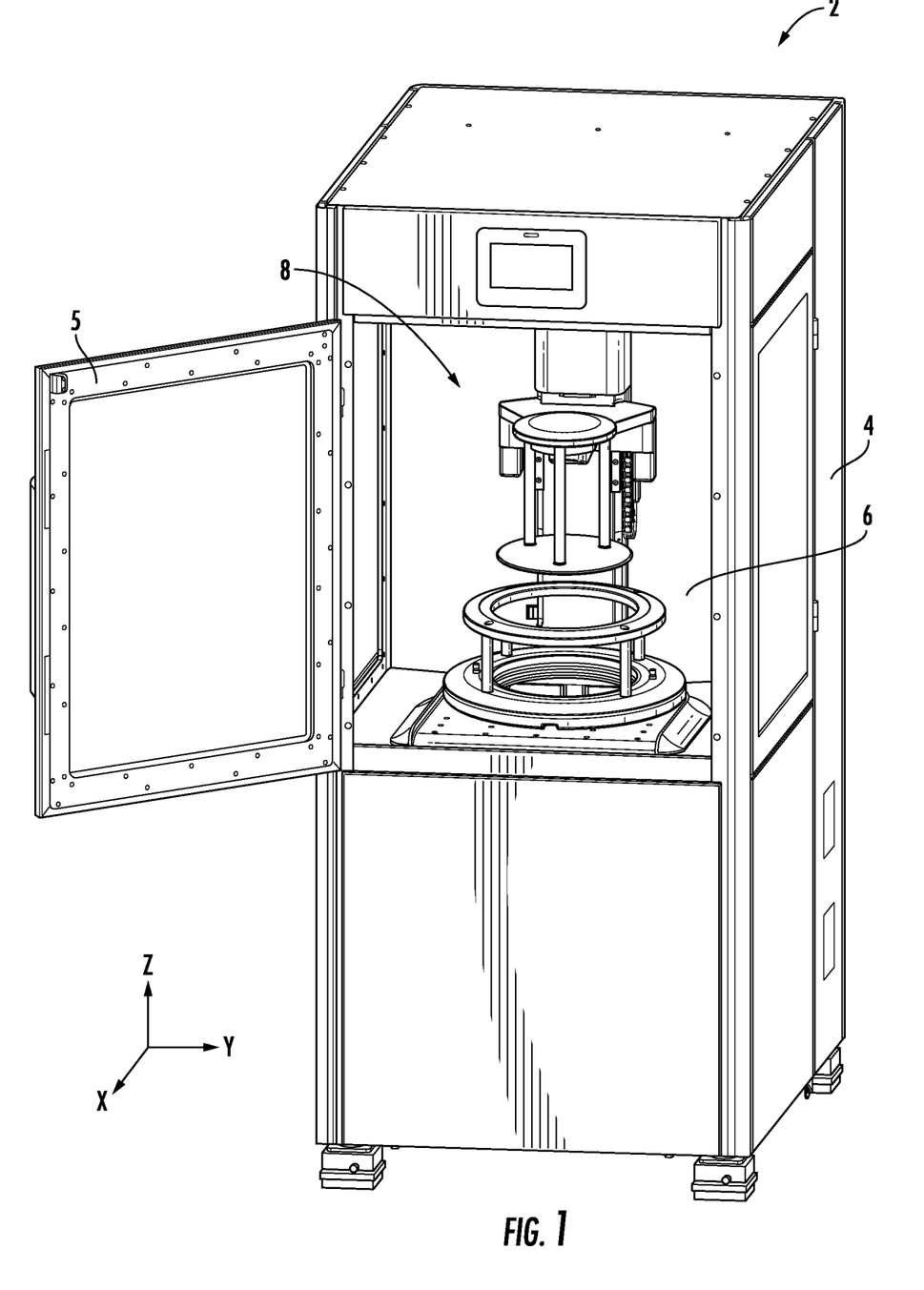
FIG. 1 is an isometric drawing depicting an embodiment of three-dimensional (3D) printing system.

FIG. 1 is an isometric drawing depicting an embodiment of three-dimensional (3D) printing system 2. In describing 3D system 2, mutually perpendicular axes X, Y, and Z will be used. Axes X and Y are generally horizontal lateral axes. Axis Z is a vertical axis that is generally aligned with a gravitational reference. In using the word "generally" it is implied that a limitation that is "generally" true is by design and to within manufacturing tolerances. Additionally angular axes theta-X, theta-Y, and theta-Z are rotational coordinates about the X, Y, and Z axes respectively. 3D printing system 2 includes an outer housing 4 that contains an internal chamber 6 containing a print engine 8. A door 5 is provided on housing 4 to allow access to the print engine 8.

Figure 2:
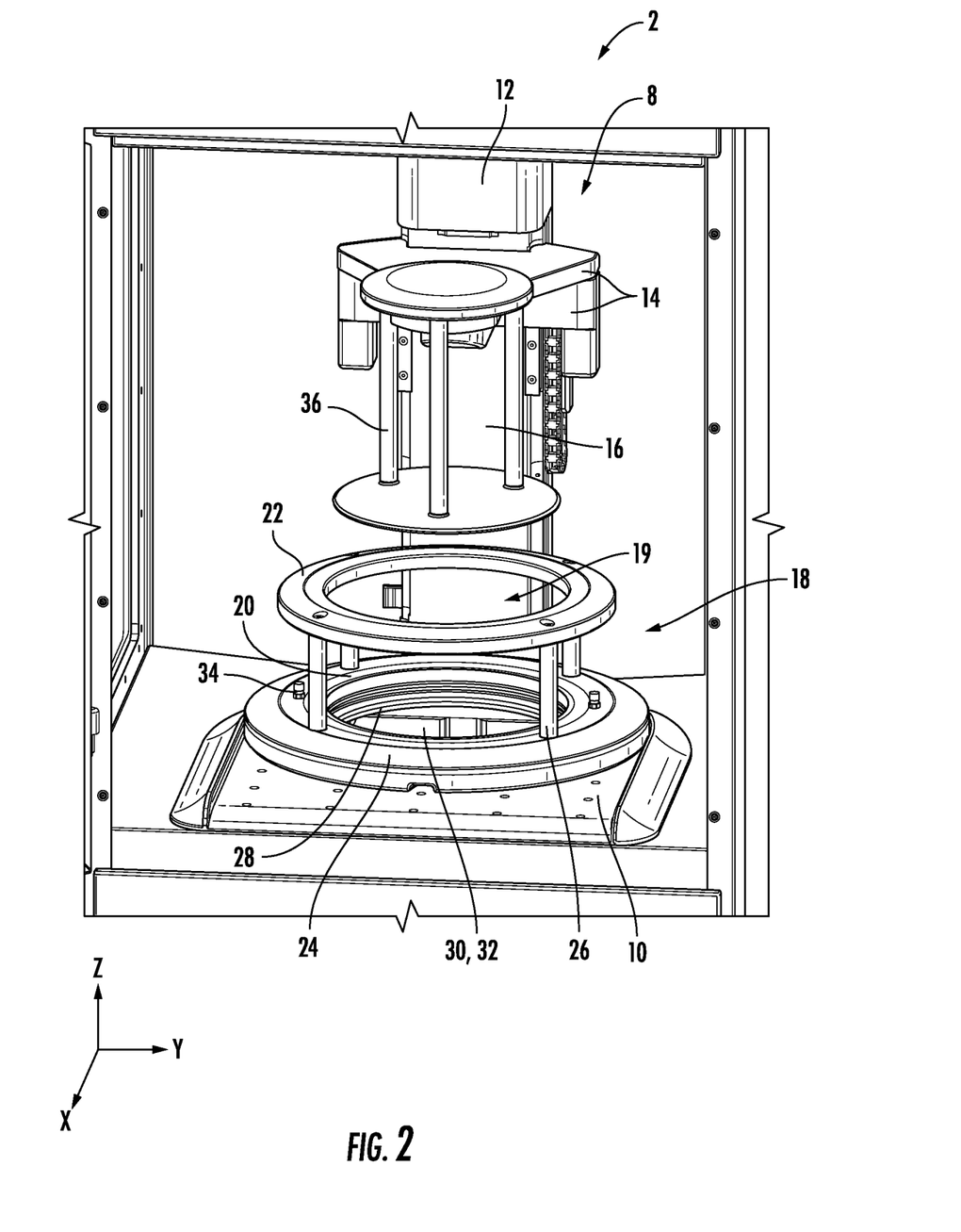
FIG. 2 is an isometric drawing depicting an embodiment of a 3D print engine.
Figure 3:
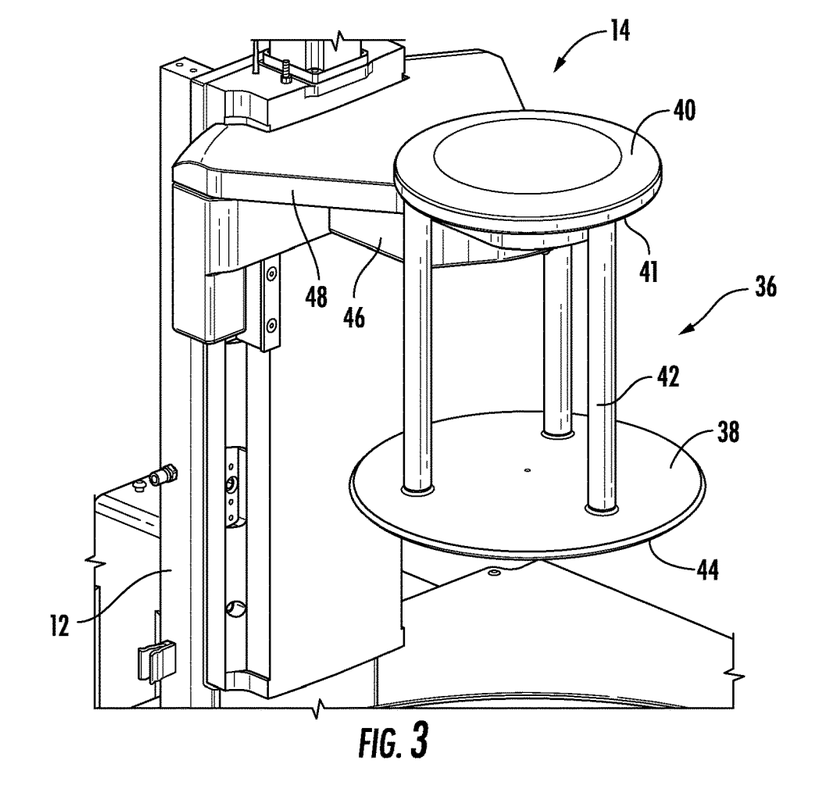
FIG. 3 is an isometric drawing depicting an embodiment of an upper portion of a 3D print engine.
Figure 4:
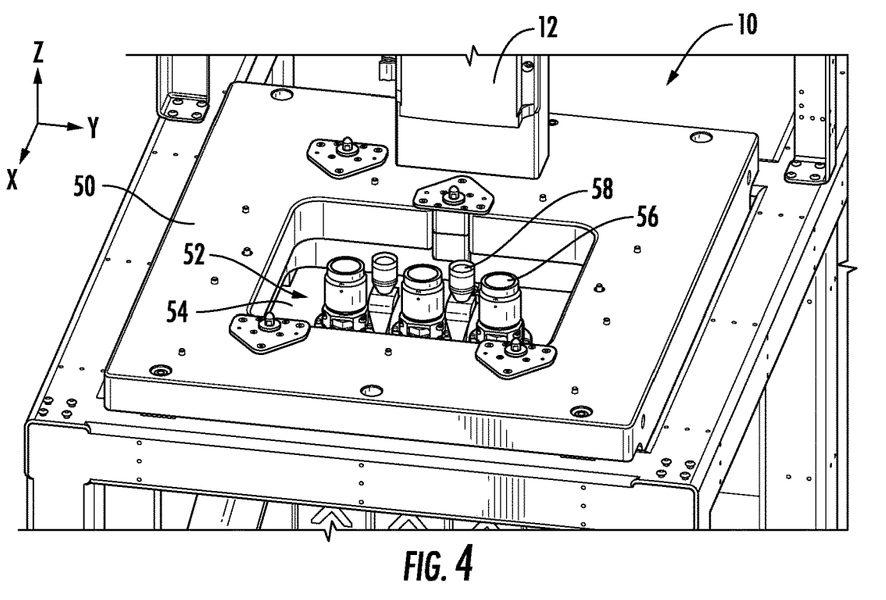
FIG. 4 is an isometric drawing depicting an embodiment of a lower portion of a 3D print engine.

FIGS. 2-4 are isometric drawings that provide further details of the print engine 8. Referring to FIG. 2, the print engine 8 includes a rigid base 10 and a vertical beam 12 extending upward from the rigid base 10. An elevator 14 is slidingly coupled to the vertical beam 12 and is configured for vertical translation along the vertical beam 12. A vertical movement mechanism 16 (not shown here in detail) is coupled to the vertical beam 12 and the elevator 14 and is configured to controllably, selectively, vertically, and accurately translate and position the elevator 14 along the vertical beam 12.

An embodiment of vertical movement mechanism 16 includes a motorized ball bearing screw mechanism or otherwise referred to as a ball screw mechanism. A ball screw mechanism includes a vertical screw shaft that passes through a ball nut. The ball nut contains recirculating steel balls and translates vertically. The vertical screw shaft has helical channels that engage the recirculating balls. The elevator 14 includes the ball nut. A motor is coupled to the vertical screw shaft and is configured to selectively rotate the vertical screw shaft. As the vertical screw shaft rotates, the action of the vertical screw shaft upon the ball nut translates the elevator upward and downward depending on a direction of rotation. Such translation mechanisms are known in the art for precision positioning along vertical, horizontal, and oblique axes. Other embodiments are possible such as a lead screw and nut system or a rack and pinion mechanism or a motorized belt/pulley system and are all known in the art for linearly translating components along various axes.

The elevator 14 is slidingly coupled to the vertical beam 12 by a linear bearing. The linear bearing has a combination of a race and ball bearings for low friction and linear movement. Other bearing designs are possible and linear bearings are known in the art for precision linear motion constraint.

Print engine 8 includes a build vessel 18 containing a photocurable fluid 20. Build vessel 18 includes an upper frame 22 coupled to a lower frame structure 24 by vertical rods 26. The photocurable fluid 20 is contained within build vessel 18 by a vessel wall 28 and a transparent sheet 30 supported by a transparent plate 32. The vessel wall 28 and the transparent sheet 30 are configured to provide an upward facing reservoir 62 (FIG. 5) for containing the photocurable fluid 20. At least one gas port 34 allows oxygenated gas or atmospheric gas to enter and exit from a space between the transparent sheet 30 and the circular glass plate 32.

Print engine 8 also includes a build platform 36 supported by the elevator 14. Referring to FIG. 3, build platform 36 includes a build plate 38 coupled to a support plate 40 via a plurality of vertical rods 42. Support plate 40 has a lower surface 41. Build plate 38 has a lower surface 44 for supporting a 3D article (not shown) that is being manufactured by 3D printing system 2. The elevator 14 includes a lower support 46 that supports an upper support 48. The support plate 40 is supported over the upper support 48 of the elevator.

Referring to FIG. 4, the rigid base 10 includes a granite plate 50 which provides stable support for mechanical and optical components of print engine 8. The granite plate 50 supports an imaging module 52. Imaging module 52 is configured to be translated along both lateral axes X and Y.

Translation along the two axes is provided by a two dimensional (2D) movement mechanism 54. In one embodiment, the movement mechanism 54 includes two movement mechanisms 54 that can have certain similarities to the vertical movement mechanism 16 described with respect to FIG. 2. In the illustrated embodiment, the movement mechanism 54 includes linear motors that drive screw or gear mechanisms along individual axes X and Y. The movement mechanisms 54 are configured to selectively position and translate the imaging module 52 along the lateral X and Y axes respectively. Other precision movement mechanisms 54 are possible and such are known in the art for precision mechanisms that are used to image 3D printing, 2D printing, and circuit photolithography.

In the illustrated embodiment, the imaging module 52 includes three light engines 56. Light engines 56 are individually projection-based light engines that are known in the art for stereolithography of photocurable resins. Such a light engine includes a light source, a spatial light modulator, projection optics, and other optical components (bending lenses or mirrors, converging and diverging lenses or mirrors, to name a few).

Interleaved between the light engines are two confocal distance sensors 58. The confocal distance sensors are non-contact distance sensors that are configured for sensing a distance and/or height of a surface of the build plate 38, transparent sheet 30, and/or glass plate 32. Confocal distance sensors 58 can be configured to utilize monochromatic or polychromatic light and are well known in the art for high accuracy. The use of other known distance sensors 58 is possible. Alternatively, the distance sensors can be based upon lasers. Some direct a beam at a small oblique angle relative to a surface normal and receive the beam with a line of sensors. The principle of triangulation is used to determine distance. Extremely accurate sensors utilize a principle of interferometry. Such sensors are known in the art and are widely available.

Figure 5:
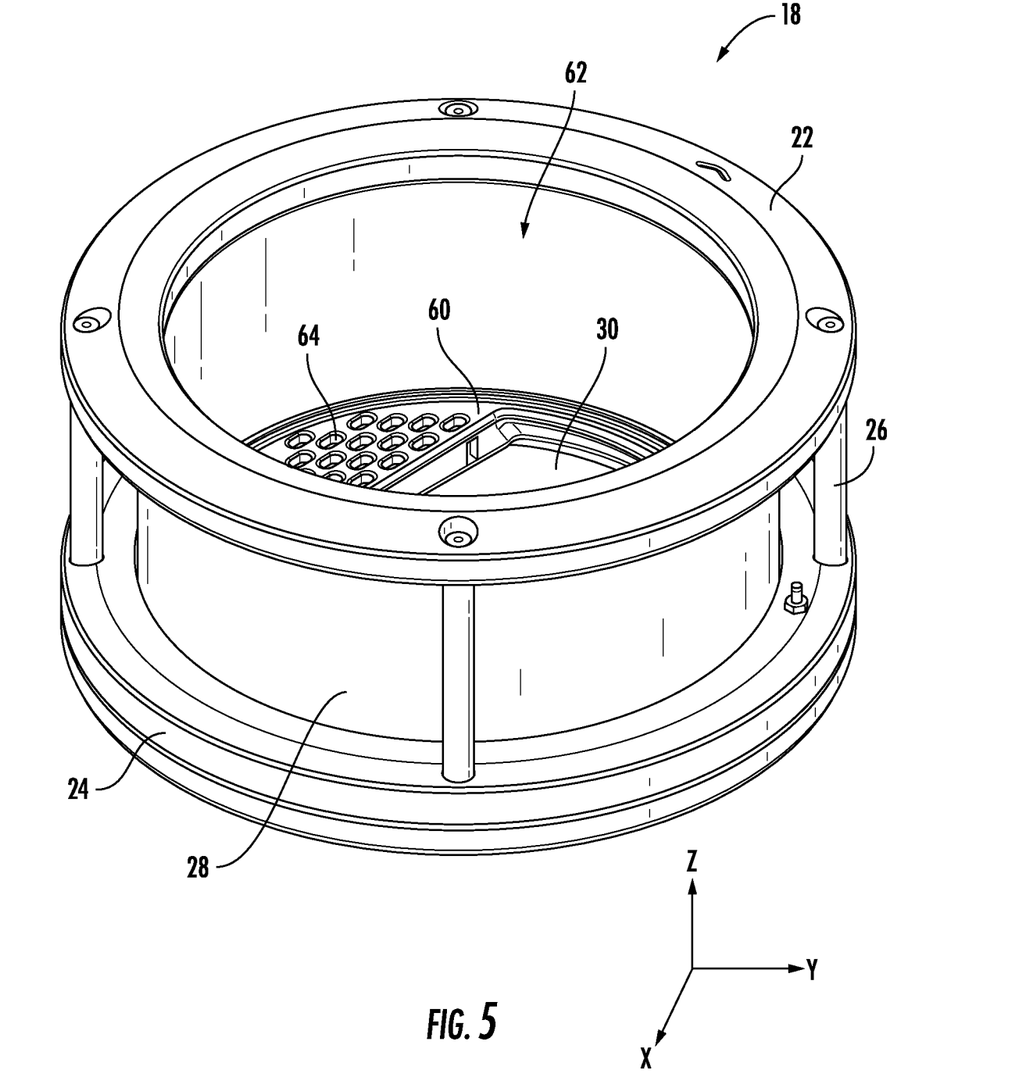
FIG. 5 is an isometric drawing depicting an embodiment of a build vessel.

FIG. 5 is an isometric view of an embodiment of build vessel 18. In the illustrated embodiment, the build vessel 18 generally has a shape of a right circular cylinder but other designs are possible that have oval, rectangular, or square lateral cross sections. The lower frame structure 24 supports or includes a vented housing 60 which will be discussed in more detail infra. The vessel wall 28 and transparent sheet 30 are configured to provide an upward facing reservoir 62 for containing the photocurable fluid 20.

Figure 6:
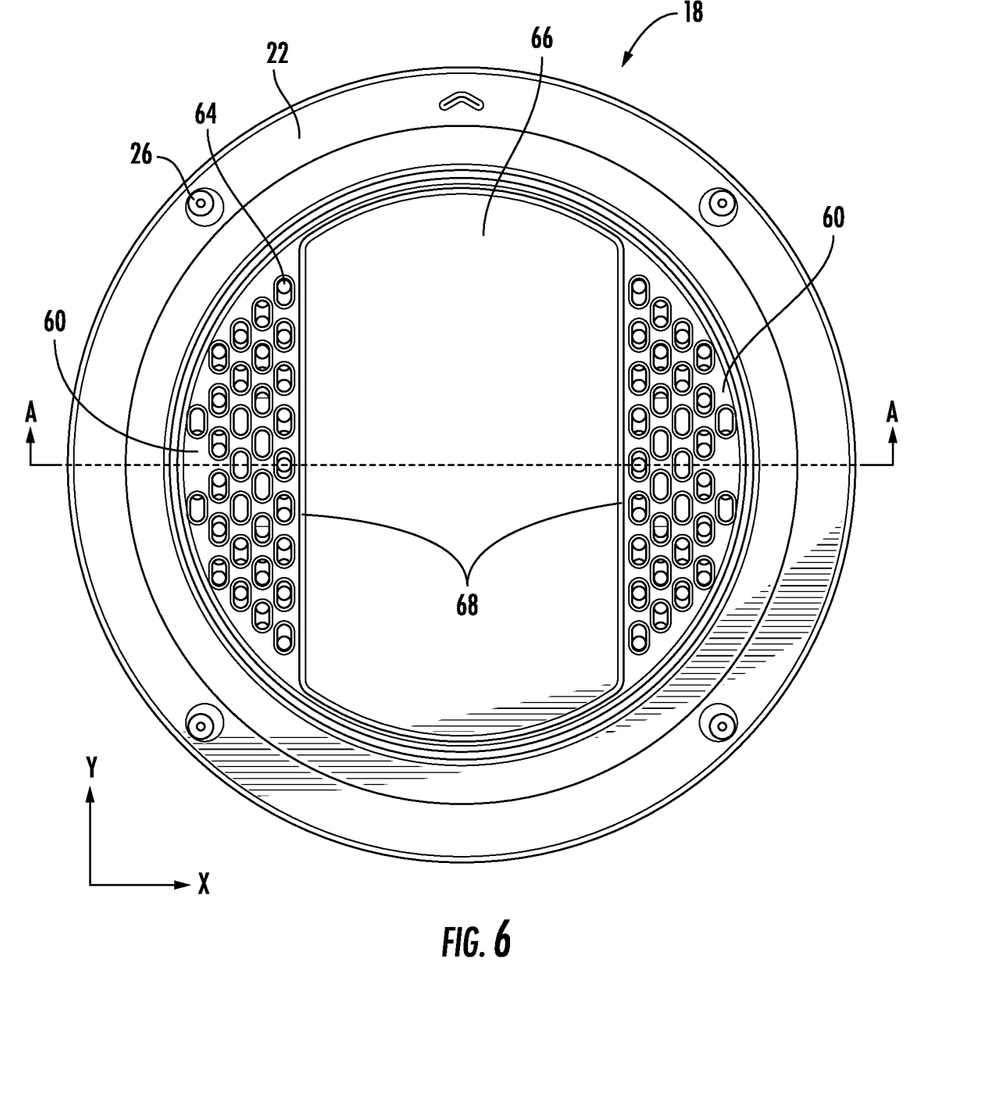
FIG. 6 is a top view (looking down in a –Z direction) drawing depicting an embodiment of a build vessel.

FIG. 6 is a top view of the build vessel 18 (looking down into the build vessel 18). The vented housing 60 includes two vented housings 60. The vented housings 60 individually define an array of perforations 64. In the illustrated embodiment, the transparent sheet 30 is circular. However, the vented housings 60 prevent imaging of resin above the transparent sheet 30 over two area truncations which are the lateral area occupied by the vented housings 60. Thus, the build plane 66 is a circular area that is truncated along two edges 68 of the vented housings 60. Thus, build plane 66 is circular with two linear truncations.

Other designs are possible. In a first alternative embodiment, the build plane 66 is a circular area with only one linear truncation. In a second alternative embodiment, the build plane 66 is a circular area that is reduced in diameter radially by an annular-shaped vented housing 60. In a third alternative embodiment, the build plane 66 is a rectangular area that is truncated along one or more edges. Yet other embodiments can have square, polygonal, truncated oval, or irregular build planes 66.

The build plane 66 is the area or region over which the imaging module 52 and the light engines 56 are configured to operate. Typically, the light engines 56 have optics that focus upon or near the build plane 66. The controller that controls the imaging module 52 images and solidifies a parallelepiped slab of the photocurable liquid 20 at the build plane 66. Thus, the focus and operation of the imaging module defines the build plane 66.

Figure 7:
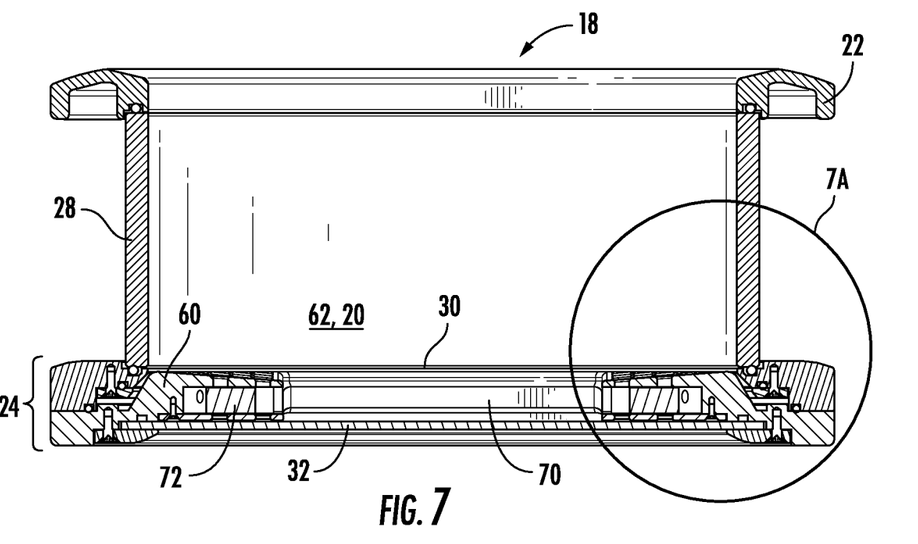
FIG. 7 is a cross-sectional view taken from A-A of FIG. 6.

FIG. 7 is a section AA taken from FIG. 6. As illustrated the vertical vessel wall 28 and the transparent sheet 30 are configured to provide the reservoir 62 for containing the photocurable liquid 20. The lower frame structure 24 supports the transparent sheet 30 and the vessel wall 28. A fixed or variable fluidic region 70 is defined between the transparent sheet 30 and the transparent plate 32.

The transparent sheet 30 and transparent plate 32 are transparent in the sense that they allow unimpeded transmission of radiation capable of curing and hardening the photocurable ink 20. In various embodiments, the radiation has a wavelength in a range of ultraviolet to blue or 100 to 500 nanometers. The particular system will utilize a wavelength within that range and therefore the sheet 30 and plate 32 will be transparent at the utilized wavelength. The transparent sheet 30 also has the property that it allows an inhibitor, typically oxygen, to diffuse from the fluid region 70 to the build plane 66. This prevents deposition of solidified photocurable liquid 20 onto the transparent sheet 30.

The photocurable ink 20 being used has a component that diffuses through the transparent sheet 30. One example of a photocurable ink 20 is a hydrogel ink or bioink, which includes, inter alia, water, hydrogel, a monomer, and a photoinitiator. The water can diffuse through the transparent sheet 30 and form a water vapor in the fluidic region 70. The diffused water can form droplets and deposits on an upper surface of the transparent plate 32 and/or a lower surface of the transparent sheet 30 which will adversely affect the optical path of radiation to the build plane 66.

The vented housing 60 contains a desiccant 72. The perforations 64 fluidically couple the desiccant 72 to the fluidic region 70. The desiccant 72 absorbs and depletes the water vapor from the fluidic region 70 which prevents the formation of droplets on the upper surface of the transparent plate 32 and/or lower surface of the transparent sheet 30.

Figure 7A:
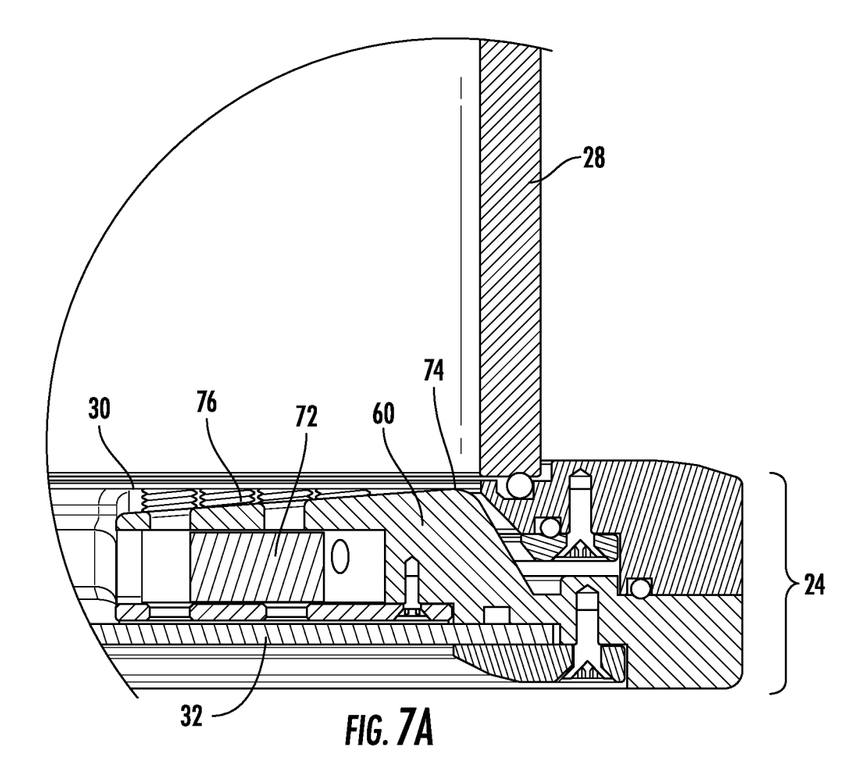
FIG. 7A is detail 7A taken from FIG. 7.

FIG. 7A is detail 7A from FIG. 7. The vented housing 60 is supported by and can be part of the lower frame structure 24. The vented housing 60 has an upper ridge 74 over which the transparent sheet 30 is stretched. The vented housing 60 also has an upper surface 76 which defines the perforations 64. The upper surface 76 is below the transparent sheet 30 and slopes down along an inward direction (radially inward) from the upper ridge 74. A vertical gap between the upper surface 76 and the transparent sheet 30 allows for the fluid communication between the perforations 64 and the fluidic region 70.

Figure 8:
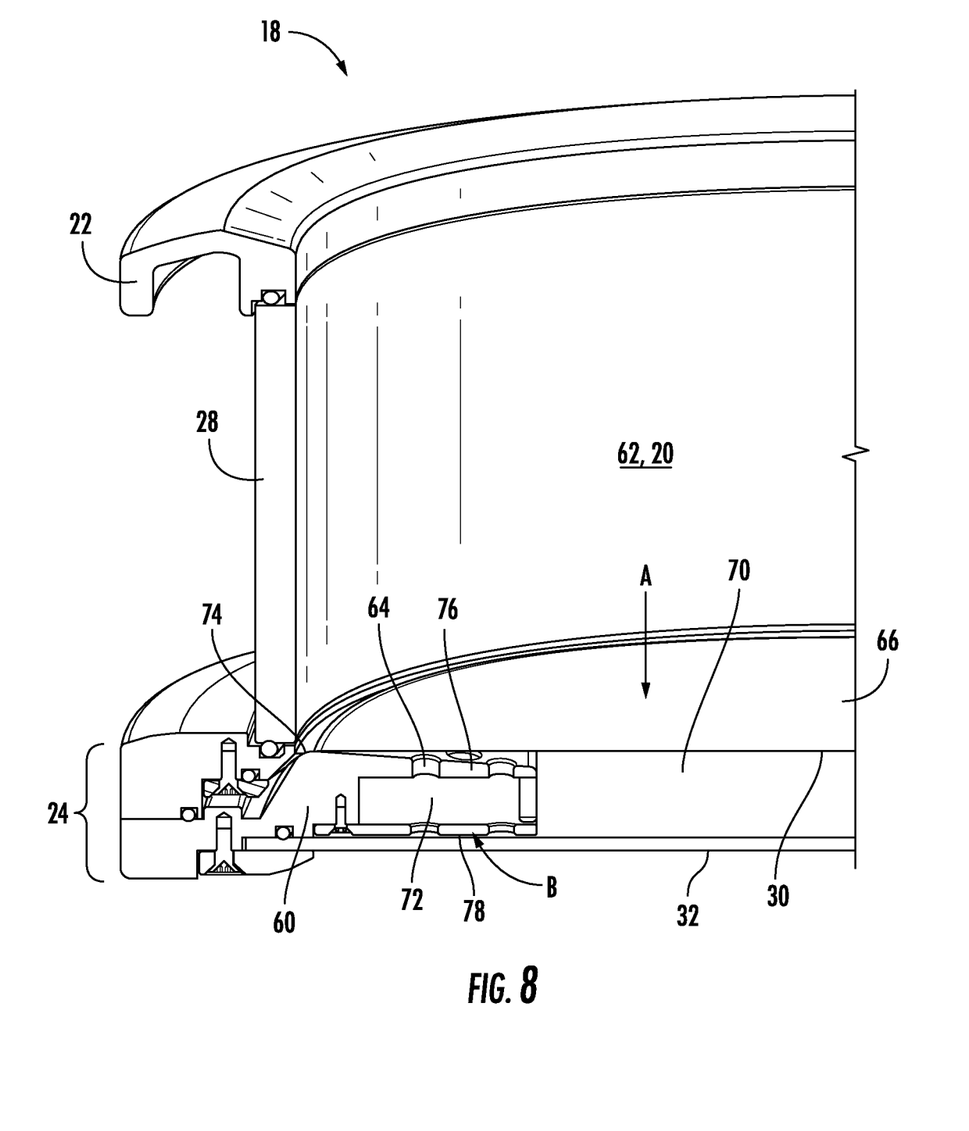
FIG. 8 is a cutaway isometric view of a portion of an embodiment of a build vessel.

FIG. 8 is cutaway isometric view of a portion of the build vessel 18 to provide some additional clarity of the prior discussion. In the illustrated embodiment, the vented housing 60 has perforations 64 along the sloping upper surface 76 and a lower surface 78 also. The flexible sheet 30 is stretched along the upper ridge 74 which generally follows the vessel wall 28. The imaging module 52 focuses radiation along the build plane 66 which less than 1 millimeter above the transparent sheet 30. The build plane 66 is truncated by the presence of the vented housing 60. Other details were discussed supra.

Figure 9:
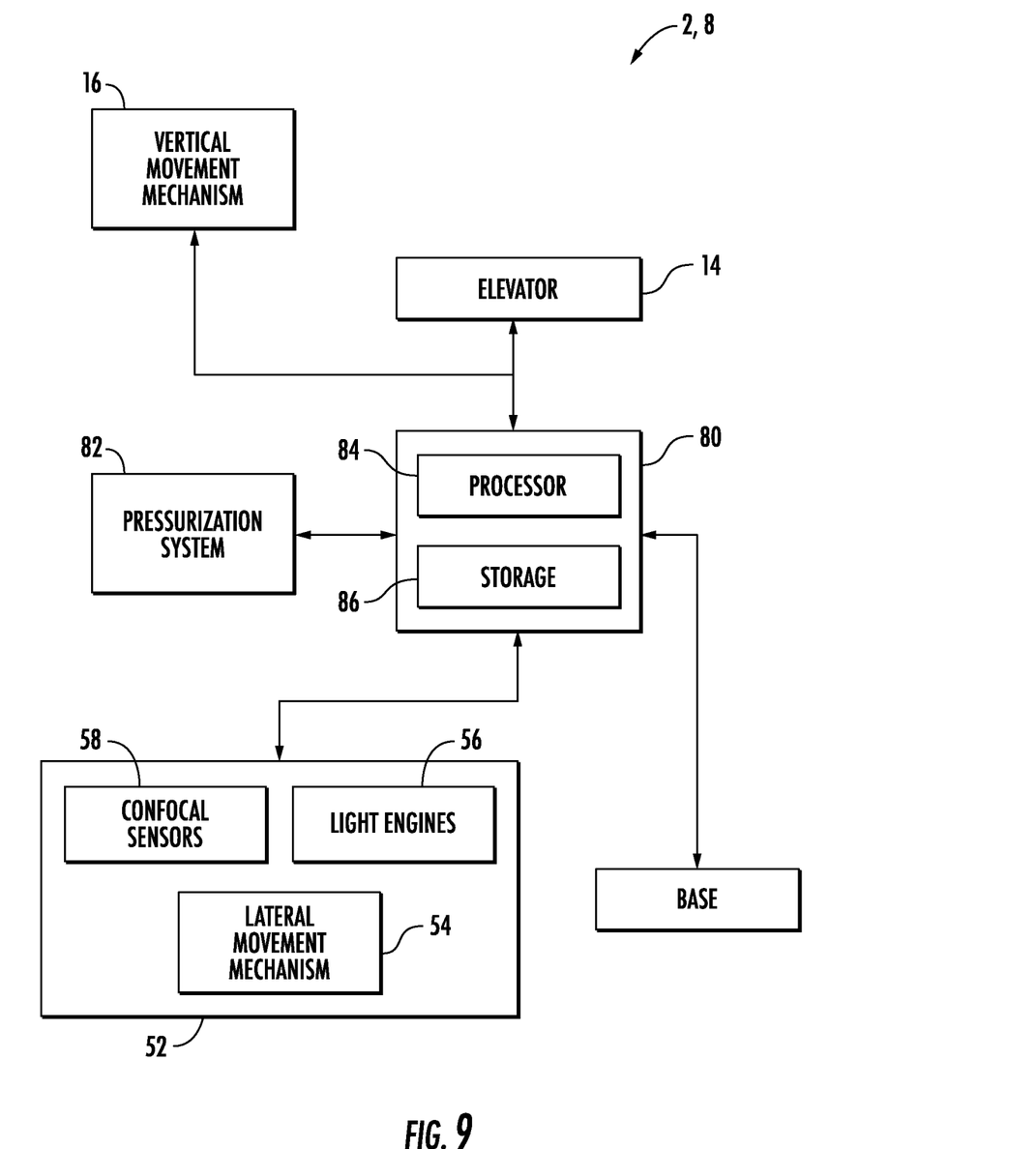
FIG. 9 is a simplified electrical block diagram of a 3D printing system.

FIG. 9 is a simplified electrical block diagram of the 3D printing system 2 which includes print engine 8. FIG. 9 is simplified in the sense that certain features of print engine 8 may be left out for simplicity. A controller 80 is coupled to various components of system 2 including elevator 14, vertical movement mechanism 16, imaging module 52, pressurization system 82, and other components and sensors not shown. Pressurization system 82 can be configured to control a fluid pressure within the fluidic region 70.

The pressurization system 82 can include a combination of components including one or more of a positive pressure source, a pressurized gas bottle, a vacuum pump, valves, and other elements. The combination of components are operated by the controller 80 to provide a desired pressure within the fluidic region 70.

Controller 80 includes a processor 84 coupled to an information storage subsystem 86 including non-transient or nonvolatile information storage devices. The information storage 86 stores software instructions that, when executed by the processor 84, operate portions of the print engine 8 including various systems and subsystems shown in FIG. 9. The controller 80 can be a single module co-located with the print engine 8 and/or include modules, computers, and/or servers that are spaced or remote from print engine 8. Controllers including processors and storage subsystems are well known in the art for control of electromechanical systems.

Figure 10:
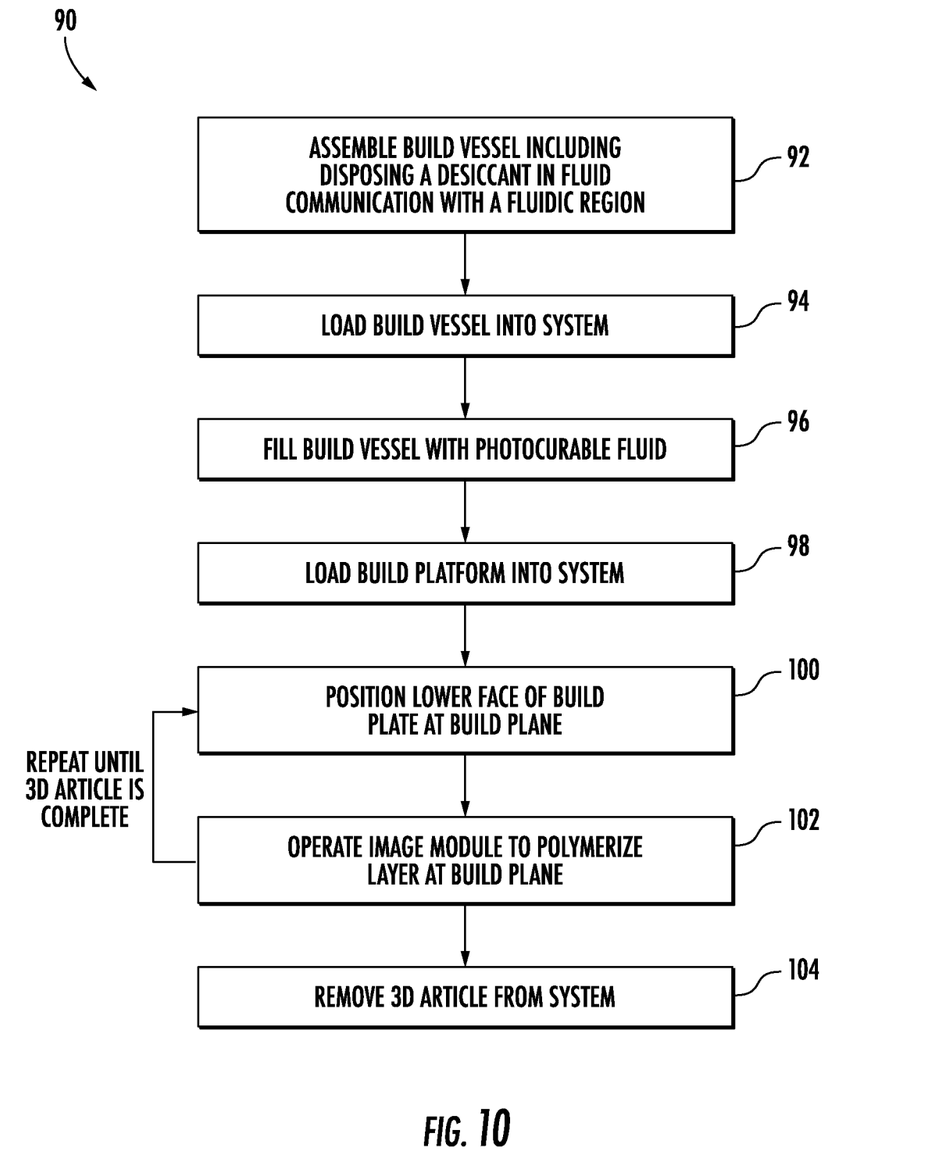
FIG. 10 is a flowchart depicting a method of manufacturing a 3D article.

FIG. 10 is a flowchart depicting a method 90 for manufacturing a 3D article using system 2. Some steps of method 90 are performed by controller 80 and some can be manually performed. According to 92, the build vessel 18 is assembled including disposing the desiccant 72 in fluid communication with the fluidic region 70.

According to 94, the build vessel 18 is loaded into system 2 and onto the rigid base 10. According to 96, photocurable fluid 20 is disposed in the reservoir 62. According to 98, the build platform 36 is loaded onto the elevator 14. As a note, the ordering of steps 94-98 can vary. For example, step 96 can take place before step 94. Also, step 98 can take place before step 96 or 94.

According to 100, the vertical movement mechanism 16 is operated to vertically position the lower surface 44 of the build plate 38 (or later a lower surface of a partially fabricated 3D article) at the build plane 66. According to 102, the imaging module 52 is then operated to selectively harden and cure a layer of the photocurable liquid 20 at the build plane 66. Steps 100 and 102 are repeated until the 3D article is fabricated. Then, according to 104, the 3D article is removed from system 2.

During step 102, the controller 80 can operate the pressurization system 82 to maintain flatness of the transparent sheet 30. In one embodiment, the pressurization system 82 can apply a positive gauge pressure can be applied to the fluidic region 70 to offset a downward pressure of a fluid column above the transparent sheet to maintain a fixed gap between the transparent sheet 30 and the transparent plate 32. In a second embodiment, the pressurization system 82 can apply a vacuum to the fluidic region 70 to flatten the transparent sheet 30 against the transparent plate 32. In yet another embodiment, a fluid column pressure above the transparent sheet can flatten the transparent sheet 30 against the transparent plate 32.

The specific embodiments and applications thereof described above are for illustrative purposes only and do not preclude modifications and variations encompassed by the scope of the following claims.

What is claimed:

1. A three-dimensional printing system comprising:
   a rigid base;
   a build vessel supported on the rigid base, the build vessel including:
      a lower frame structure;
      a transparent plate supported by the lower frame structure;
      a transparent sheet supported by the lower frame structure above the transparent plate with a fixed or variable vertical fluidic region between the transparent plate and the transparent sheet;
      a vented housing supported by the lower frame structure, the vented housing including openings fluidically communicating with the fluidic region;
      a desiccant disposed within the vented housing; and
      a vessel wall coupled to the lower frame structure, the vessel wall and transparent sheet configured to provide an upward facing reservoir; and
   an imaging module supported by the rigid base and configured to selectively image a photocurable liquid over a build plane above the transparent sheet.

2. The three-dimensional printing system of claim 1 wherein the vented housing includes a lateral array of perforations that provide fluid communication between the desiccant and the fluidic region.

3. The three-dimensional printing system of claim 1 wherein the transparent sheet is stretched over a portion of the vented housing.

4. The three-dimensional printing system of claim 1 wherein the vented housing has a perforated upper surface, the transparent sheet is stretched above the perforated upper surface forming a gap between the perforated upper surface and the transparent sheet that is in fluid communication with the fluidic region which allows the desiccant to deplete vapors that are trapped in the fluidic region.

5. The three-dimensional printing system of claim 4 wherein the vented housing has an upper ridge that stretches the transparent sheet over the perforated upper surface.

6. The three-dimensional printing system of claim 1 wherein the build plane is truncated by an edge of the vented housing.

7. The three-dimensional printing system of claim 1 wherein the upward facing reservoir contains the photocurable liquid, the photocurable liquid including water, the water diffuses through the transparent sheet and to the fluidic region, the desiccant configured to absorb water vapor resulting from the water diffusing through the transparent sheet.

8. The three-dimensional printing system of claim 1 further comprising:
   a vertical beam that extends upward from the rigid base;
   a build platform with a build plate;
   an elevator mechanism configured to vertically position the build platform and the build plate; and
   a controller configured to operate at least the elevator mechanism and the imaging module.

\* \* \* \* \*